United States Patent
An et al.

(10) Patent No.: US 10,116,964 B2
(45) Date of Patent: Oct. 30, 2018

(54) METHOD OF SUB-PREDICTION UNIT PREDICTION IN 3D VIDEO CODING

(71) Applicant: HFI INNOVATION INC., Zhubei, Hsinchu County (TW)

(72) Inventors: Jicheng An, Beijing (CN); Kai Zhang, Beijing (CN); Yi-Wen Chen, Taichung (TW); Jian-Liang Lin, Yilan County (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 717 days.

(21) Appl. No.: 14/517,787

(22) Filed: Oct. 17, 2014

(65) Prior Publication Data

US 2016/0112721 A1  Apr. 21, 2016
US 2018/0077427 A9  Mar. 15, 2018

Related U.S. Application Data

(63) Continuation-in-part of application No. PCT/CN2013/086271, filed on Oct. 31, 2013.

(51) Int. Cl.
 *H04N 13/00* (2018.01)
 *H04N 19/51* (2014.01)
 (Continued)

(52) U.S. Cl.
 CPC ....... *H04N 19/597* (2014.11); *H04N 13/0022* (2013.01); *H04N 13/0048* (2013.01);
 (Continued)

(58) Field of Classification Search
 CPC .... H04N 19/105; H04N 19/157; H04N 19/51; H04N 19/597
 (Continued)

(56) References Cited

U.S. PATENT DOCUMENTS

2005/0286635 A1* 12/2005 Kumar ............. H04N 19/00151
  375/240.16
2011/0206123 A1*  8/2011 Panchal ................ H04N 19/70
  375/240.15
(Continued)

FOREIGN PATENT DOCUMENTS

WO  2012171477 A1  12/2012
WO  2013108690 A1   7/2013

OTHER PUBLICATIONS

Sinangil, et al.: "Cost and Coding Efficient Motion Estimation Design Considerations for High Efficiency Video Coding (HEVC) Standard"; IEEE Journal of Selected Topics in Signal Processing • Dec. 2013; pp. 1016-1028.

*Primary Examiner* — Deirdre Beasley
(74) *Attorney, Agent, or Firm* — Oblon, McClelland, Maier & Neustadt. L.L.P.

(57) ABSTRACT

A method for a three-dimensional encoding or decoding system incorporating restricted sub-PU level prediction is disclosed. In one embodiment, the sub-PU level prediction associated with inter-view motion prediction or view synthesis prediction is restricted to the uni-prediction. In another embodiment, the sub-PU partition associated with inter-view motion prediction or view synthesis prediction is disabled if the sub-PU partition would result in sub-PU size smaller than the minimum PU split size or the PU belongs to a restricted partition group. The minimum PU split size may correspond to 8×8. The restricted partition group may correspond to one or more asymmetric motion partition (AMP) modes.

6 Claims, 4 Drawing Sheets

(51) Int. Cl.
*H04N 19/597* (2014.01)
*H04N 13/128* (2018.01)
*H04N 13/161* (2018.01)

(52) U.S. Cl.
CPC ......... *H04N 13/128* (2018.05); *H04N 13/161* (2018.05); *H04N 19/51* (2014.11)

(58) Field of Classification Search
USPC .......................................................... 348/44
See application file for complete search history.

(56) References Cited

U.S. PATENT DOCUMENTS

| | | | | |
|---|---|---|---|---|
| 2012/0314027 | A1* | 12/2012 | Tian ....................... | H04N 7/181 |
| | | | | 348/43 |
| 2014/0072041 | A1* | 3/2014 | Seregin ............ | H04N 19/00569 |
| | | | | 375/240.13 |
| 2014/0301437 | A1* | 10/2014 | Wang ...................... | H04N 19/70 |
| | | | | 375/240.02 |
| 2014/0301463 | A1* | 10/2014 | Rusanovskyy ........ | H04N 19/52 |
| | | | | 375/240.14 |
| 2015/0078450 | A1* | 3/2015 | Chen ................ | H04N 19/00769 |
| | | | | 375/240.16 |
| 2015/0098509 | A1* | 4/2015 | Sung .................... | H04N 19/597 |
| | | | | 375/240.16 |
| 2015/0195506 | A1* | 7/2015 | Lin ...................... | H04N 19/597 |
| | | | | 375/240.16 |
| 2016/0165263 | A1* | 6/2016 | Zhang .................. | H04N 19/597 |
| | | | | 375/240.12 |
| 2016/0173888 | A1* | 6/2016 | Park .................... | H04N 19/597 |
| | | | | 375/240.08 |

* cited by examiner

METHOD OF SUB-PREDICTION UNIT PREDICTION IN 3D VIDEO CODING

CROSS REFERENCE TO RELATED APPLICATIONS

The present invention is a continuation-in-part and claims priority to PCT Patent Application, Serial No. PCT/CN2013/086271, filed on Oct. 31, 2013, entitled "Methods for Sub-PU Level Prediction". The PCT Patent Application is hereby incorporated by reference in its entirety.

FIELD OF THE INVENTION

The present invention relates to three-dimensional video coding. In particular, the present invention relates to sub-PU (prediction unit) based prediction associated with inter-view motion prediction (IVMP) and view synthesis prediction (VSP) for texture coding in a three-dimensional (3D) coding system.

BACKGROUND AND RELATED ART

Three-dimensional (3D) television has been a technology trend in recent years that intends to bring viewers sensational viewing experience. Various technologies have been developed to enable 3D viewing and the multi-view video is a key technology for 3DTV application among others. To exploit the inter-view redundancy, 3D coding tools such as sub-PU level inter-view motion prediction (SPIVMP) and view synthesized prediction (VSP) have been integrated to conventional 3D-HEVC (High Efficiency Video Coding) or 3D-AVC (Advanced Video Coding) codec.

The SPIVMP processing in the current 3DV-HTM (three-dimensional video coding based on High Efficiency Video Coding (HEVC) Test Model) is illustrated in FIG. 1. A current processed PU (122) in a current dependent view (i.e., V1 120) is divided into multiple sub-PUs, (i.e., A, B, C and D) where each sub-PU has a smaller size. The disparity vector (DV) associated with each sub-PU is added to the respective position (as illustrated by a dot in the center of each sub-PU) to locate a respective prediction block (i.e., A', B', C' or D') in the reference view (i.e., V0 110), where the prediction blocks (i.e., A', B', C' and D') in the reference view are already coded. The prediction blocks cover the sample positions are used as reference blocks. The DV used to derive a reference block in a reference view for each sub-PU can be a derived DV and the derived DV can be different for each sub-PU or all sub-PUs can share a unified derived DV.

For each reference block, if it is coded using motion compensated prediction (MCP), the associated motion parameters (i.e., $MV_{A'}$, $MV_{B'}$, $MV_{C'}$, and $MV_{D'}$ associated with reference view V0) can be used as temporal inter-view motion vector candidate (TIVMC) for the corresponding sub-PU in the current PU in the current view. Otherwise, the corresponding sub-PU can share the candidate motion parameters with its spatial neighbors. The TIVMC of the current PU is composed of the TIVMC of all the sub-PUs. The sub-PU size can be 4×4, 8×8, 16×16, etc, which can be indicated by a flag in video parameter set (VPS).

An example of VSP processing is shown in FIG. 2. For a texture PU (222) in a current dependent view (T1 220), the DV (240) associated with a neighboring block (224) can be used to located a corresponding depth block (234) of the depth picture in the reference view (D0 230). The DV (240) is used to locate a co-located block (232) of the depth picture in the reference view (D0 230). The samples in the current texture PU (222) are warped into corresponding samples in the reference texture view (T0 210). The mappings (250*a-c*) illustrate an example of mapping samples in the current texture PU to samples in the reference texture picture according to DVs converted from corresponding depth values. The VSP method in current 3D-HEVC also uses the sub-PU level prediction (as indicated by dashed lines in block 232 and block 222) and the sub-PU size can be 8×4 or 4×8. Accordingly, the texture PU (222) may be divided into sub-PUs and each sub-PU is mapped to a corresponding depth sub-block.

In current 3D-HEVC, the sub-PU level inter-view motion prediction (IVMP) and the sub-PU view synthesis prediction (VSP) are allowed for small PUs to be further split. For example, a PU can be further split into 8×4 or 4×8 sub-PUs for SPIVMP or VSP. The small sub-PUs will cause increase system memory bandwidth. In order to reduce the memory bandwidth in motion compensation, the bi-prediction for small PU sizes (8×4, 4×8) has been disabled in the conventional HEVC. It is desirable to develop modified existing 3D-HEVC coding tools such as SPIVMP and view synthesized prediction (VSP) to relief the high memory bandwidth requirement while retaining the performance.

BRIEF SUMMARY OF THE INVENTION

A method for a three-dimensional encoding or decoding system incorporating restricted sub-PU level prediction is disclosed. First embodiments according to the present invention split a current texture PU into sub-PUs, locate depth sub-blocks or texture sub-blocks in a reference view corresponding to the current texture PU using first derived DVs (disparity vectors) and generate temporal prediction for the current texture PU using motion information of the texture sub-blocks in the reference view or generate inter-view prediction based on warped texture samples in the reference view using the depth sub-blocks. When the generated temporal prediction or the inter-view prediction for a three-dimensional coding tool is bi-prediction, the current texture PU is encoded or decoded using only the temporal prediction or the inter-view prediction in List0.

An embodiment of applying the three-dimensional coding tool disables bi-prediction when the sub-PUs are smaller than a minimum PU split size. The minimum PU split size may correspond to 8×8. When current PU width or current PU height is X times of the minimum PU split width or the minimum PU split height and X is greater than or equal to 1, the current texture PU is divided horizontally or vertically into ceiling(X) sub-PU widths or sub-PU heights respectively. The first ceiling(N)−1 sub-PU columns or rows have the minimum PU split width or the minimum PU split height respectively. The last sub-PU column or row have width or height equal to the current PU width or current PU height minus the ceiling(X) times of the minimum PU split width or the minimum PU split height respectively. Ceiling(X) corresponds to a smallest integer not less than X.

Second embodiments according to the present invention perform the following steps when the sub-PUs from splitting the current texture PU are not smaller than a minimum PU split size or the current texture PU does not belong to a restricted partition group: splitting the current texture PU into said sub-PUs; locating depth sub-blocks or texture sub-blocks in a reference view corresponding to the current texture PU using first derived DVs (disparity vectors); and generating temporal prediction for the current texture PU using motion information of the texture sub-blocks in the reference view or generating inter-view prediction based on warped texture samples in the reference view using the depth sub-blocks according to a three-dimensional coding tool. When the sub-PUs from splitting the current texture PU are smaller than the minimum PU split size or the current texture PU belongs to the restricted partition group, the second embodiments perform the following steps: locating a depth block or a texture block in the reference view corresponding to the current texture PU using a second derived DV; and generating the temporal prediction for the current texture PU using the motion information of the texture block in the reference view or generating the inter-view prediction based on the warped texture samples in the reference view using the depth block. After the temporal prediction or the inter-view prediction is generated for both cases, the current texture PU is encoded or decoded using the temporal prediction or the inter-view prediction.

The restricted partition group may contain one or more asymmetric motion partition (AMP) mode selected from PART_2NxnU, PART_2NxnD, PART_nLx2N, and PART_nRx2N.

DETAILED DESCRIPTION OF THE INVENTION

Figure 1:
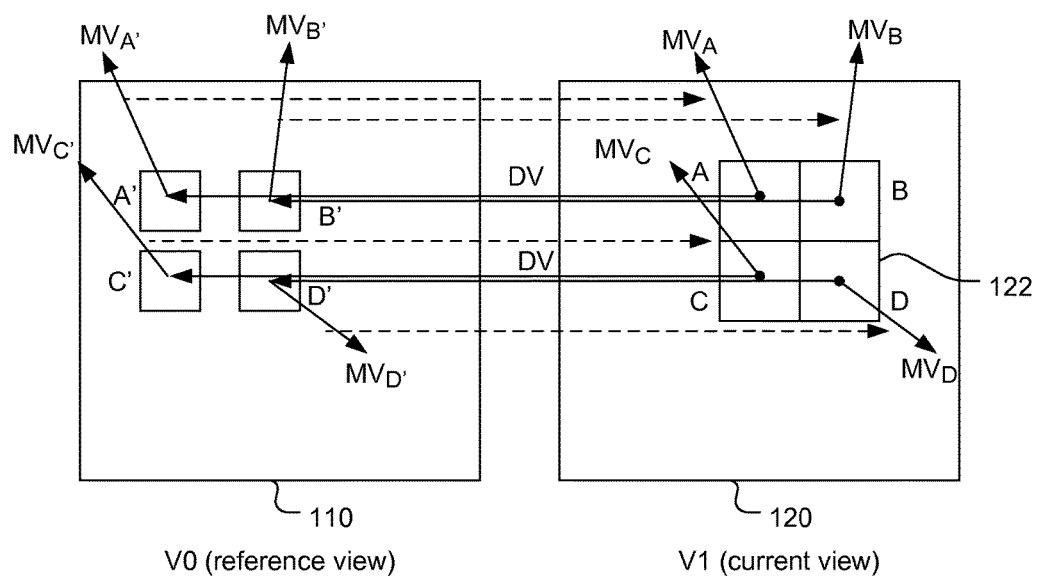
FIG. 1 illustrates an example of sub-PU (prediction unit) level prediction associated with inter-view motion prediction (IVMP) for three-dimensional video coding.
Figure 2:
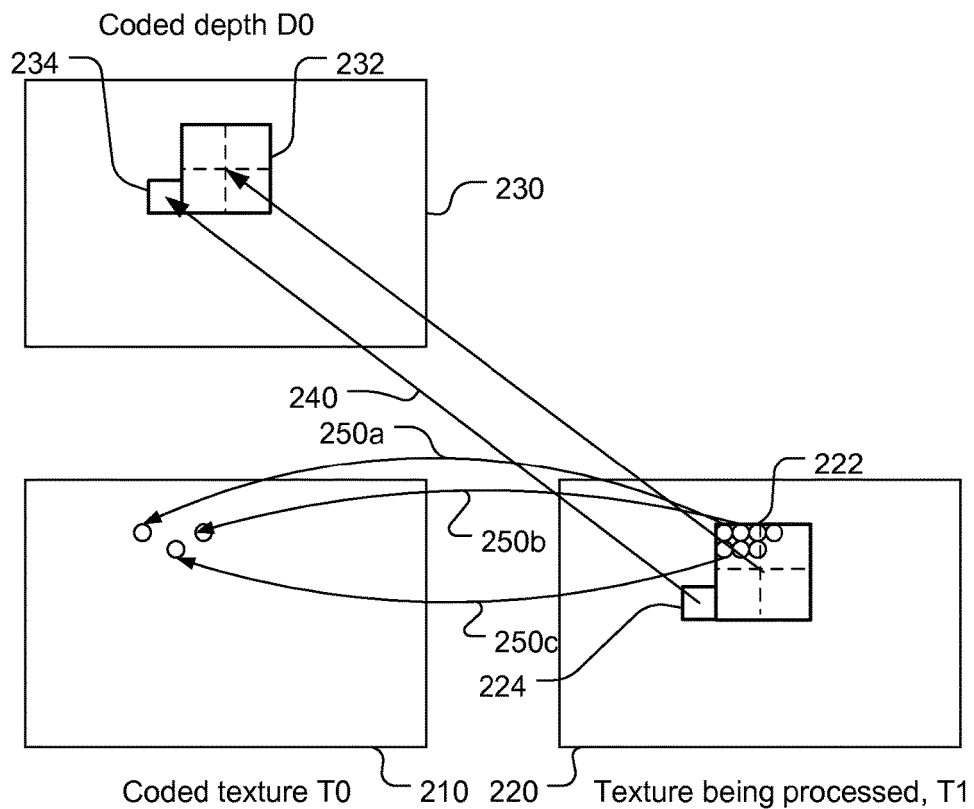
FIG. 2 illustrates an example of view synthesis prediction (VSP), where a depth block in the reference view corresponding to a PU (prediction nit) in a dependent view is used to warp corresponding texture data in the reference view according to the depth block to form VSP.
Figure 3:
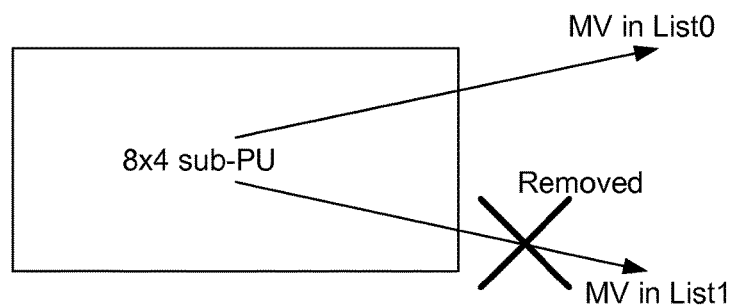
FIG. 3 illustrates an example of restricted sub-PU (prediction unit) level prediction according to an embodiment of the present invention, where the inter-view motion prediction or view synthesis prediction is restricted to uni-prediction when the sub-PU is smaller than minimum PU split size.

As mentioned above, the use of sub-PU for small block sizes may cause system bandwidth issue. It is desirable to develop a method to relieve the high memory bandwidth requirement while retaining the system performance. Accordingly, the present invention conditionally imposes restrictions on the sub-PU sizes for certain 3D coding tools. In one embodiment, the bi-prediction mode is disabled when the sub-PU size is smaller than a specified size, such as 8×8. One example of restricted sub-PU according to the present invention is shown in FIG. 3. The sub-PU size is 8×4 which is smaller than a specific size (8×8 in this example). In a conventional system, bi-prediction is allowed for this sub-PU size. Therefore, the conventional approach will allow the sub-PU to use both motion vectors (MVs) in list 0 (List0) and list 1 (List1). However, an embodiment according to the present invention will restrict the prediction in a 3D coding tool to uni-prediction by using only one list such as List0. In other words, prediction in List1 is disabled. Alternatively, the uni-prediction can only use List 1 by disabling List0 for motion prediction in the 3D coding tool. The 3D coding tool may correspond to inter-view motion prediction or view synthesis prediction.

In another embodiment, the sub-PU size is restricted not to be smaller than a specified size. For example, the specified minimal size can be set to 8×8. In this case, if a PU size is 16×12, the PU will not be split in the vertical direction since the height (i.e., 12) is less than twice of the specified height (i.e., 8). Therefore, the PU can only be divided into two 8×12 sub-PUs. For a 16×4 PU, the height (i.e., 4) is already smaller than the specified height (8), so that the PU will not be divided.

In yet another embodiment, whether the sub-PU level prediction is used or not depends on the size or the partitioning type of the current PU. For example, if the size of the current PU (width or height) is smaller than a specified value (e.g., 8), the sub-PU level prediction is not allowed for the current PU. In another example, if the current PU uses asymmetric motion partition (AMP) mode (e.g. PartMode equal to PART_2NxnU, PART_2NxnD, PART_nLx2N, or PART_nRx2N), the sub-PU level prediction is not allowed for the current PU. The sub-PU level prediction may correspond to sub-PU level inter-view motion prediction (SPIVMP) or view synthesis prediction (VSP).

As mentioned earlier, the present invention is intended to relieve the bandwidth requirement due to small sub-PU sizes for inter-view coding tools such as sub-PU level inter-view motion prediction (SPIVMP) and view synthesized prediction (VSP). The performance of a 3D video coding system incorporating restricted sub-PU is compared with the performance of a conventional system based on HTM-9.0 as shown in Table 1, where the sub-PU bi-prediction is disabled when the PU size is smaller than 8×8. The performance comparison is based on different sets of test data listed in the first column. The BD-rate differences are shown for texture pictures in view 1 (video 1) and view 2 (video 2). A negative value in the BD-rate implies that the present invention has a better performance. As shown in Table 1, BD-rate measure for view 1 and view 2 is about the same as the conventional HTM-9.0. The BD-rate measure for the coded video PSNR with video bitrate, the coded video PSNR with total bitrate (texture bitrate and depth bitrate), and the synthesized video PSNR with total bitrate are all about the same as the conventional HTM-9.0. The processing times (encoding time, decoding time and rendering time) are also compared. As shown in Table 1, slight increases in encoding time and rendering time (1.4 and 2.5%) and slight decrease in decoding time (1.1% in average) are noted. Accordingly, the system that uses restricted sub-PU level prediction for SPIVMP and VSP according to one embodiment of the present invention achieves about the same performance as the conventional HTM-9.0. In other words, there is no performance loss due to the present invention.

TABLE 1

| | Video 1 | Video 2 | Video PSNR/video bitrate | Video PSNR/total bitrate | Synth PSNR/total bitrate | Enc time | Dec time | Ren time |
|---|---|---|---|---|---|---|---|---|
| Balloons | −0.06% | −0.02% | −0.01% | −0.02% | −0.09% | 100.5% | 94.8% | 102.1% |
| Kendo | −0.07% | −0.08% | −0.03% | −0.02% | −0.06% | 101.3% | 110.5% | 108.2% |
| Newspapercc | 0.11% | 0.04% | 0.02% | 0.03% | −0.01% | 100.9% | 100.5% | 106.2% |
| GhostTownFly | 0.04% | −0.09% | 0.00% | 0.00% | −0.01% | 102.8% | 97.3% | 101.4% |
| PoznanHall2 | 0.03% | 0.18% | 0.04% | 0.02% | 0.04% | 101.6% | 95.0% | 95.7% |
| PoznanStreet | −0.04% | −0.08% | −0.01% | −0.01% | −0.02% | 100.3% | 97.1% | 97.7% |
| UndoDancer | 0.04% | −0.03% | 0.00% | −0.01% | −0.03% | 101.9% | 93.4% | 104.1% |
| Shark | −0.01% | −0.05% | −0.01% | 0.00% | 0.00% | 101.9% | 103.0% | 105.0% |
| 1024 × 768 | −0.01% | −0.02% | 0.00% | 0.00% | −0.06% | 100.9% | 101.9% | 105.5% |
| 1920 × 1088 | 0.01% | −0.01% | 0.00% | 0.00% | 0.00% | 101.7% | 97.2% | 100.8% |
| average | 0.00% | −0.02% | 0.00% | 0.00% | −0.02% | 101.4% | 98.9% | 102.5% |

Figure 4:
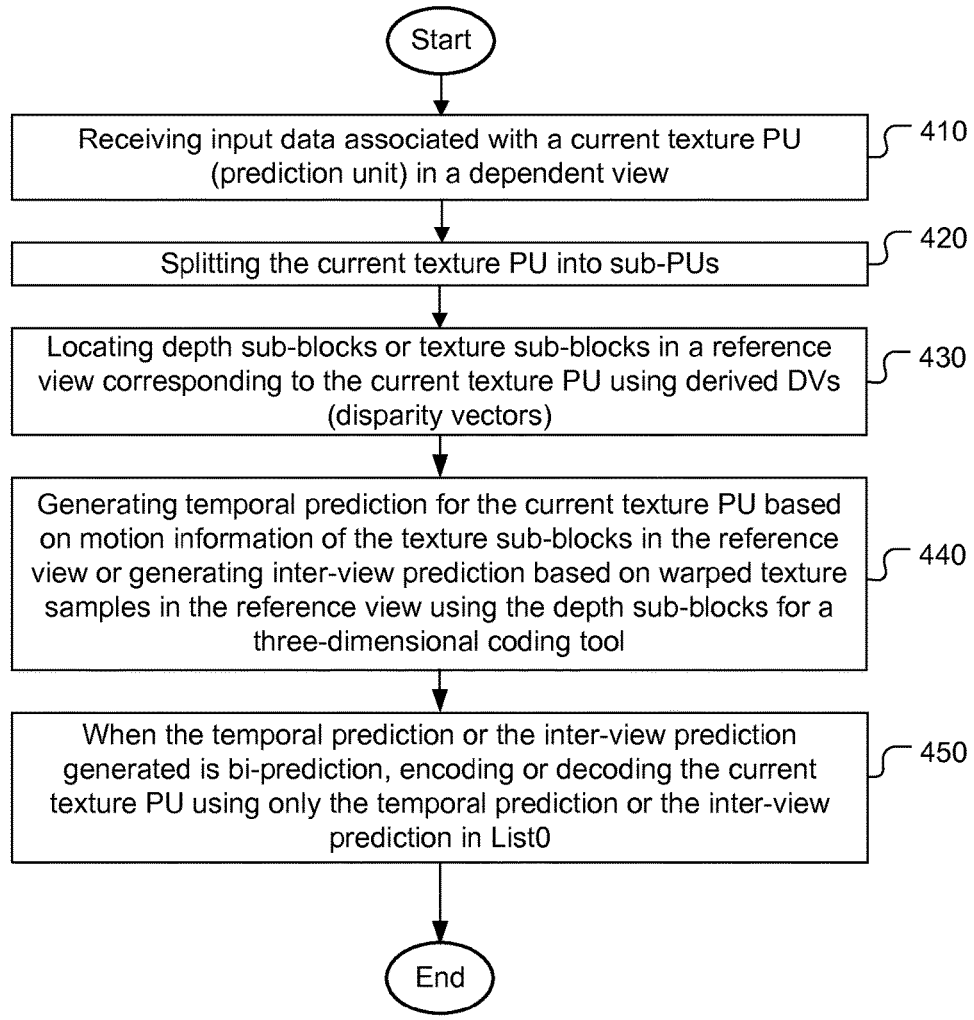
FIG. 4 illustrates an exemplary flowchart of restricted sub-PU (prediction unit) level prediction according to an embodiment of the present invention, where bi-prediction is disabled if the sub-PU is smaller than minimum PU split size.

FIG. 4 illustrates an exemplary flowchart of a three-dimensional encoding or decoding system incorporating restricted sub-PU level prediction according to an embodiment of the present invention. The system receives input data associated with a current texture PU (prediction unit) in a dependent view in step 410. For encoding, the input data corresponds to texture PU data and any associated data (e.g., motion information) to be encoded. For decoding, the input data corresponds to coded texture PU and any associated information to be decoded. The input data may be retrieved from memory (e.g., computer memory, buffer (RAM or DRAM) or other media) or from a processor. The current texture PU is split into sub-PUs as shown in step 420. The depth sub-blocks or texture sub-blocks in a reference view corresponding to the current texture PU are located by using derived DVs (disparity vectors) as shown in step 430. Temporal prediction for the current texture PU is generated using motion information of the texture sub-blocks in the reference view or the inter-view prediction is generated based on warped texture samples in the reference view using the depth sub-blocks for a three-dimensional coding tool as shown in step 440. When the temporal prediction or the inter-view prediction generated is bi-prediction, the current texture PU is encoded or decoded using only the temporal prediction or the inter-view prediction in List0 as shown in step 450.

Figure 5:
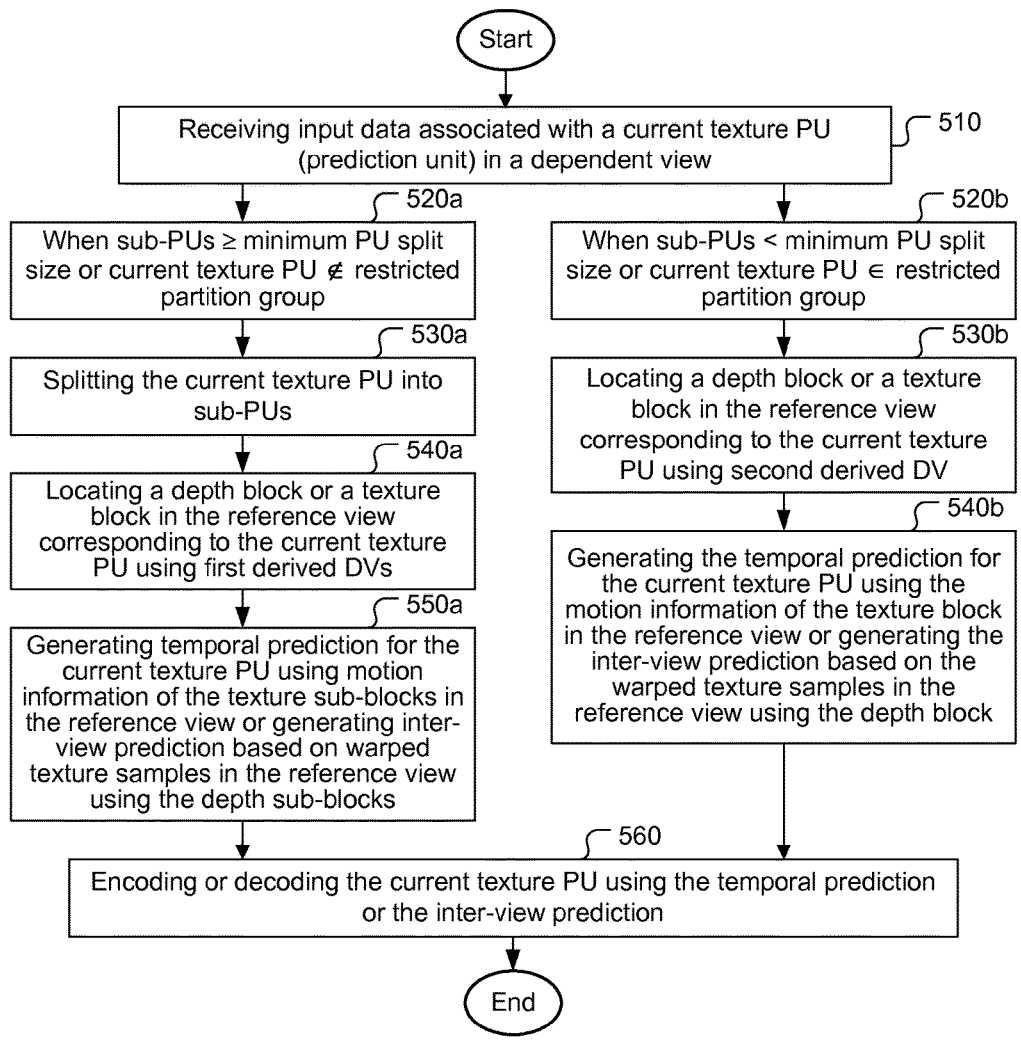
FIG. 5 illustrates an exemplary flowchart of restricted sub-PU (prediction unit) level prediction according to another embodiment of the present invention, where sub-PU is disabled if the sub-PU is smaller than minimum PU split size or the PU belongs to a restricted partition group.

FIG. 5 illustrates an exemplary flowchart of a three-dimensional encoding or decoding system incorporating restricted sub-PU partition according to another embodiment of the present invention. The system receives input data associated with a current texture PU (prediction unit) in a dependent view in step 510. When sub-PUs from splitting the current texture PU are greater than or equal to a minimum PU split size or the current texture PU does not belong to a restricted partition group (step 520a), then steps 530a to 550a are performed. In step 530a, the current texture PU is split into said sub-PUs. In step 540a, depth sub-blocks or texture sub-blocks in a reference view corresponding to the current texture PU is located by using first derived DVs (disparity vectors). In step 550a, temporal prediction for the current texture PU is generated using motion information of the texture sub-blocks in the reference view or inter-view prediction is generated based on warped texture samples in the reference view using the depth sub-blocks for a three-dimensional coding tool. When the sub-PUs from splitting the current texture PU are smaller than the minimum PU split size or the current texture PU belongs to the restricted partition group (step 520b), then steps 530b to 540b are performed. In step 530b, a depth block or a texture block in the reference view corresponding to the current texture PU is located using a second derived DV. In step 540b, the temporal prediction for the current texture PU is generated using the motion information of the texture block in the reference view or the inter-view prediction is generated based on warped texture samples in the reference view using the depth block. After the temporal prediction or the inter-view prediction is generated for the current texture PU, the current texture PU is encoded or decoded using the temporal prediction or the inter-view prediction as shown in step 560.

The flowcharts shown above are intended to illustrate examples 3D or multi-view coding with restricted sub-PU partition according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for three-dimensional or multi-view video encoding or decoding, the method comprising:
   receiving input data associated with a current texture PU (prediction unit) in a dependent view;
   when a size of the current texture PU is not smaller than a threshold size and the current texture PU corresponds to a symmetric partition:
      splitting the current texture PU into sub-PUs;
      locating depth sub-blocks or texture sub-blocks in a reference view corresponding to the current texture PU using first derived DVs (disparity vectors); and
      generating temporal prediction or inter-view prediction for the current texture PU using SPIVMP (sub-PU level inter-view motion prediction) or VSP (view synthesized prediction), the temporal prediction being based on motion information of the texture sub-blocks in the reference view, and the inter-view prediction being based on warped texture samples in the reference view using the depth sub-blocks;
   when the current texture PU corresponds to an asymmetric partition:
      locating a depth block or a texture block in the reference view corresponding to the current texture PU using a second derived DV; and
      generating the temporal prediction or inter-view prediction for the current texture PU without using the SPIVMP or without using the VSP; and
   encoding or decoding the current texture PU using the temporal prediction or the inter-view prediction.

2. The method of claim 1, wherein the threshold size corresponds to 8×8.

3. The method of claim 1, wherein the asymmetric partition includes a size of PART_2NxnU, PART_2NxnD, PART_nLx2N, or PART_nRx2N.

4. An apparatus for three-dimensional or multi-view video coding, the apparatus comprising one or more electronic circuits configured to:
   receive input data associated with a current texture PU (prediction unit) in a dependent view;
   when a size of the current texture PU is not smaller than a threshold size and the current texture PU corresponds to a symmetric partition:
      split the current texture PU into sub-PUs;
      locate depth sub-blocks or texture sub-blocks in a reference view corresponding to the current texture PU using first derived DVs (disparity vectors); and
      generate temporal prediction or inter-view prediction for the current texture PU using SPIVMP (sub-PU level inter-view motion prediction) or VSP (view synthesized prediction), the temporal prediction being based on motion information of the texture sub-blocks in the reference view, and the inter-view prediction being based on warped texture samples in the reference view using the depth sub-blocks;
   when the current texture PU corresponds to an asymmetric partition:
      locate a depth block or a texture block in the reference view corresponding to the current texture PU using a second derived DV; and
      generate the temporal prediction or inter-view prediction for the current texture PU without using the SPIVMP or without using the VSP; and
   encode or decode the current texture PU using the temporal prediction or the inter-view prediction.

5. The apparatus of claim 4, wherein the threshold size corresponds to 8×8.

6. The apparatus of claim 4, wherein the asymmetric partition includes a size of PART_2NxnU, PART_2NxnD, PART_$_{nLx}$2N, or PART_$_{nRx}$2N.

* * * * *